US009479576B2

(12) United States Patent
Sinn et al.

(10) Patent No.: US 9,479,576 B2
(45) Date of Patent: Oct. 25, 2016

(54) IMAGE SESSION RANKING (71) Applicant: Adobe Systems Incorporated, San Jose, CA (US)

(72) Inventors: Richard P. Sinn, Milpitas, CA (US); Allan M. Young, Santa Rosa, CA (US)

(73) Assignee: Adobe Systems Incorporated, San Jose, CA (US)

( * ) Notice: Subject to any disclaimer, the term of this patent is extended or adjusted under 35 U.S.C. 154(b) by 190 days.

(21) Appl. No.: 13/908,965

(22) Filed: Jun. 3, 2013

(65) Prior Publication Data
US 2014/0359482 A1    Dec. 4, 2014

(51) Int. Cl.
| | |
|---|---|
| *G06F 3/048* | (2013.01) |
| *H04L 29/08* | (2006.01) |
| *G06F 17/30* | (2006.01) |
| *G06Q 10/00* | (2012.01) |
| *H04L 12/18* | (2006.01) |
| *H04W 4/20* | (2009.01) |
| *H04W 4/02* | (2009.01) |

(52) U.S. Cl.
CPC ............ *H04L 67/104* (2013.01); *G06F 3/048* (2013.01); *G06F 17/30165* (2013.01); *G06Q 10/00* (2013.01); *H04L 12/18* (2013.01); *H04L 12/1818* (2013.01); *H04W 4/206* (2013.01); *H04W 4/02* (2013.01)

(58) Field of Classification Search
CPC .. G06Q 10/10; G06Q 10/101; G06Q 10/103; G06F 3/0481; G06F 17/30165
USPC ........................................................ 715/753
See application file for complete search history.

(56) References Cited

U.S. PATENT DOCUMENTS

| | | | |
|---|---|---|---|
| 8,893,010 B1 * | 11/2014 | Brin et al. ..................... 715/738 |
| 9,330,145 B2 * | 5/2016 | Satyanarayanan .. G06F 17/3053 |
| 2003/0236832 A1 | 12/2003 | McIntyre et al. |
| 2008/0281793 A1 * | 11/2008 | Mathur ............. G06F 17/30023 |
| 2008/0288499 A1 | 11/2008 | Choi et al. |
| 2012/0030282 A1 | 2/2012 | Brody et al. |
| 2012/0158720 A1 * | 6/2012 | Luan ................. G06F 17/30867 707/732 |
| 2012/0239618 A1 * | 9/2012 | Kung .................. G06F 21/6218 707/621 |
| 2012/0239763 A1 * | 9/2012 | Musil ..................... G06Q 50/01 709/206 |
| 2012/0324002 A1 * | 12/2012 | Chen ................. G06F 17/30274 709/204 |
| 2013/0007667 A1 | 1/2013 | Sauve et al. |
| 2013/0013699 A1 | 1/2013 | Huxley |

(Continued)

FOREIGN PATENT DOCUMENTS

| | | |
|---|---|---|
| EP | 2479684 | 7/2012 |
| WO | WO-2008021104 | 2/2008 |

OTHER PUBLICATIONS

"Foreign Office Action", GB Application No. 1409849.5, Nov. 21, 2014, 10 pages.

(Continued)

*Primary Examiner* — Alvin Tan
(74) *Attorney, Agent, or Firm* — Wolfe-SBMC (57) ABSTRACT

Image session ranking techniques are described. In one or more implementations, indications are received that a plurality of image sharing sessions are available for joining by one or more potential members. The plurality of image sharing sessions are prioritized based on one or more ranking criteria that are usable to determine a relative likelihood that a user wishes to join respective image sharing sessions. A list is formed of suggested image sharing sessions that are arranged, one or another, based on the priority.

20 Claims, 7 Drawing Sheets

(56) References Cited

U.S. PATENT DOCUMENTS

| | | | |
|---|---|---|---|
| 2013/0018960 A1* | 1/2013 | Knysz | H04L 65/403 709/204 |
| 2013/0036112 A1* | 2/2013 | Poon | G06Q 50/01 707/723 |
| 2013/0124508 A1 | 5/2013 | Paris | |
| 2014/0298201 A1* | 10/2014 | Tsui | G06F 3/0484 715/753 |

OTHER PUBLICATIONS

"Combined Search and Examination Report", GB Application No. 1409849.5, Nov. 21, 2014, 10 pages.

"Foreign Office Action", GB Application No. 1409849.5, Jun. 18, 2015, 4 pages.

* cited by examiner

IMAGE SESSION RANKING

BACKGROUND

The prevalence of image capture devices is ever increasing. This may be due in part to inclusion of cameras in mobile communication devices such as mobile phones, tablets, and so on. Because of this, users may be able to capture images at a variety of different locations as desired.

For example, a user may view and/or participate in an event, such as a sports event, concert, social event (e.g., wedding, birthday), and so on. Because the event may have quite a few attendees, there may be a good likelihood of images being captured by a large portion of the attendees due to the prevalence of image capture devices. However, conventional techniques that were utilized to share images could be involved, limited to attendees "known" to the user, and so on. Thus, even though images may be captured by a variety of different attendees it may be difficult to share these images between the attendees using conventional techniques. Further, conventional techniques may make it difficult for a user to differentiate between image sharing sessions and thus a user may become overwhelmed and frustrated in such instances.

SUMMARY

Image session ranking techniques are described. In one or more implementations, indications are received that a plurality of image sharing sessions are available for joining by one or more potential members. The plurality of image sharing sessions are prioritized based on one or more ranking criteria that are usable to determine a relative likelihood that a user wishes to join respective image sharing sessions. A list is formed of suggested image sharing sessions that are arranged, one or another, based on the priority.

In one or more implementations, a computing device includes a housing having a mobile form factor, a display device disposed on the housing, and one or more modules disposed in the housing and implemented at least partially in hardware. The one or more modules are configured to collect invitations to join respective ones of a plurality of image sharing sessions and display a list of the image sharing session on the display device, the list having the plurality of image sharing sessions prioritized, one to another, based on a likelihood that a user will desire to join respective sessions.

In one or more implementations, a system includes at least one computing device configured to perform operations. The operations include prioritizing a plurality of image sharing sessions in real time based on one or more ranking criteria that are usable to determine a relative likelihood that a user wishes to join respective said image sharing sessions and forming a list of suggested image sharing sessions arranged, one or another, based on the prioritizing configured for output in a user interface, the forming also performed in real time.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

The increasing prevalence of image capture devices (e.g., cameras on mobile phones) has resulted in a corresponding increase in the amount of images captured even by an average user. Further, this prevalence has also increased the likelihood that relatively large proportions of attendees at an event not only have access to an image capture device but actively use the device as part of their interaction with the event. However, conventional techniques that were utilized to share images often involved manual communication of the images and were often limited to "known" users, such as friends of a user. Further, conventional techniques could be limited in informing a user as to which image sharing sessions are available to the user.

Image session ranking techniques are described. In one or more implementations, techniques are described to add potential members to an image sharing session that may be maintained "over the cloud" by a service provider. For example, a broadcast technique may be employed in which an invitation is broadcast by a creator of an image sharing session over a local wireless area network, such as a network configured according to the Bluetooth wireless standard, the Wi-Fi wireless standard, or other wireless standards. Thus, in this example a mobile phone of the creator of the image sharing session may broadcast the invitation locally to other attendees of an event without "knowing" the other attendees. A variety of other examples are also contemplated which do not involve a broadcast.

Consequently, a user may receive a large number of invitations to a variety of different image sharing sessions associated with a variety of different events. Therefore, techniques may be employed to rank the image sharing sessions based on a likelihood that a user may wish to join the image sharing session. A variety of different types of criteria may be utilized to perform this ranking, which may include proximity, whether a user associated with an image sharing session is "known" to the user that is to join the event, social network information (e.g., "likes" and comments), a number of members that have joined an image sharing session, and so on. In this way, a user may be presented with a prioritized list of image sharing sessions that have an increased likelihood of being of interest to a user. Further discussion of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
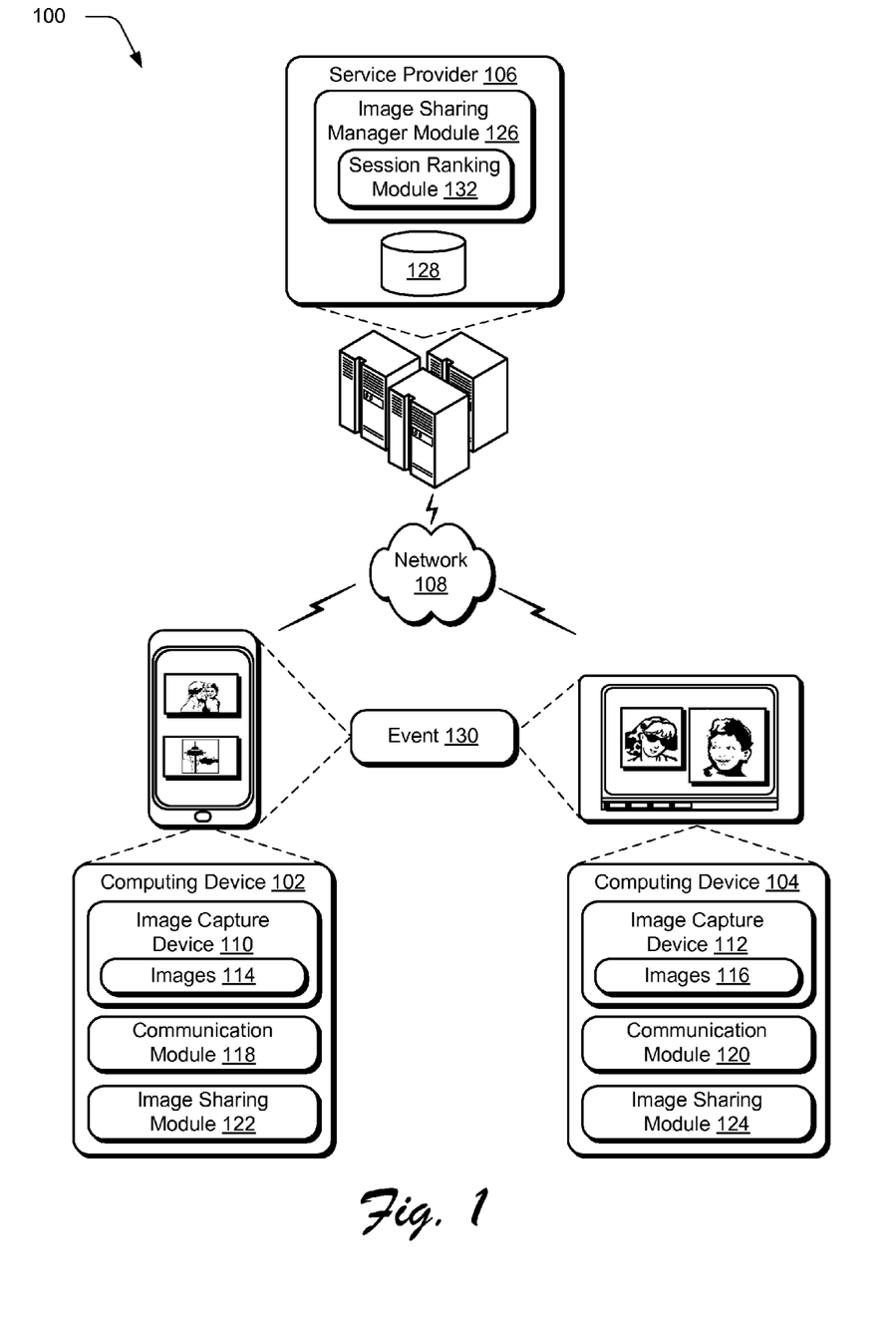
FIG. 1 is an illustration of an environment in an example implementation that is operable to employ techniques described herein relating to image session ranking.

FIG. 1 is an illustration of an environment 100 in an example implementation that is operable to employ techniques described herein. The illustrated environment 100 includes computing devices 102, 104 and a service provider 106 that are communicatively coupled via a network 108. The computing devices 102, 104 may be configured in a variety of ways.

The computing devices 102, 104 for instance, may be configured as desktop computers, laptop computers, a mobile device (e.g., assuming a mobile form factor such as a tablet or mobile phone), and so forth. Thus, the computing devices 102, 104 may range from full resource devices with substantial memory and processor resources (e.g., personal computers, game consoles) to a low-resource device with limited memory and/or processing resources (e.g., mobile devices, a dedicated camera, video recorder, and so on). Additionally, each of the computing devices 102, 104 may be representative of a plurality of different devices, such as multiple servers utilized by a business to perform operations "over the cloud" as shown as implementing the service provider 106 and as further described in relation to FIG. 7.

Each of the computing devices 102, 104 is illustrated as including a respective image capture device 110, 112. The images capture devices 110, 112 are representative of software and hardware functionality to capture images 114, 116, respectively. As such, the image capture devices 110, 112 may be configured in a variety of ways to capture images, such as through use of a charge coupled device (CCD) and so on.

The computing devices 102, 104 are also illustrated as including respective communication modules 118, 120. The communication modules 118, 120 are representative of functionality to communicate via the network 108. For example, the communication modules 118, 120 may include software and hardware to support a wired network connection, such as with a wired Ethernet, modem to a plain old telephone system (POTS), cable connection, digital subscriber line (DSL), and so on.

The communication modules 118, 120 may also include functionality to communicate with the network 108 wirelessly. This may include support of short to midrange communication, which may include near (e.g., IEEE 802.15.1 standards also known as the "Bluetooth" wireless standard) and midrange (e.g., IEEE 802.11 standards also known as the "Wi-Fi" wireless standard) wireless communications over a wireless local area network. This may also include use for relatively far distances over a wireless wide area network, including IEEE 802.16 which is also known as the "WiMAX" wireless standard, cellular technologies (e.g., 3G, 4G, LTE), and so on.

One of the most difficult problems in group photography is to gather people in the group to take pictures together in an event. Conventional techniques involved inviting people via email or via a social network to share images. However, invitations sent this way often created obstacles for invitees, which could hinder a user's desire to participate in sharing images. Further, these invitations were often limited to "known" users, e.g., a user's friends in a social network, and so on.

Accordingly, techniques may be employed by the environment 100 to invite potential members to join an image sharing session. As illustrated, the computing devices 102, 104 include respective image sharing modules 122, 124 and the service provider 106 includes an image sharing manager module 126 and storage 128. These modules are representative of functionality to create and manage membership of an image sharing session. For example, a user of computing device 102 may attend an event 130, such as a sporting event as illustrated, a social event (e.g., birthday, wedding), concert, speech, and so on. The image sharing module 122 may provide an option to create an image sharing session for association with the event through communication with the image sharing manger module 126 via the network 106.

The user may then utilize the image sharing module 122 and computing device 102 to invite other attendees of the event 130 to join the image sharing session. This may be performed in a variety of ways, such as to employ a proximity invitation system 130 to add potential members to the image sharing session. For example, the computing device 102 may leverage a local wireless area network to broadcast an invitation to another computing device 104 located at the event 130. The invitation may then be used to join the image sharing session through interaction with the image sharing module 124, further discussion of which may be found in relation to FIG. 2.

Other examples are also contemplated, such as to leverage a scanning technique. Computing device 104, for instance, may display a representation (e.g., a quick response code) usable to identify a user associated with the computing device 104, e.g., a user account. A user of computing device 102 may then capture an image of this representation and use it to join the user to the image sharing session. In another instance, a user of computing device 102 that caused the image sharing session to be created may display a representation that identifies the image sharing session. A user of computing device 104 may then capture an image of this representation and use it to join the image sharing session.

Regardless of the invitation technique used, the image sharing session may be managed by the image sharing manager module 126 to share images. This may include support of sharing of images from storage 128, support of direct communication between the computing devices 102, 104 without communication through the service provider 106, and so on.

However, as previously described conventional techniques may also make it difficult to locate an image sharing session of interest. For example, conventional techniques required a contributor to somehow become aware of the existence of an image sharing session explicitly, such as via an email, social network message, text message, and so on to start contributing images. Thus, conventional techniques involved manual management on the part of a creator of the session as well as prospective contributors to join an image sharing session, which could be frustrating, time consuming, and limited to "known" users.

Accordingly, the image sharing manager module 126 is also illustrated as including a session ranking module 132. The session ranking module 132 is representative of functionality to rank sessions based on a relative likelihood that a user may desire to join respective image sharing sessions. A variety of different criteria may be employed to perform this ranking, such as proximity, contact information, social network information, and so on. Additionally, although the session ranking module 132 is illustrated as being implemented by the service provider 106, the session ranking module 132 may be implemented in a variety of other ways, such as part of the image sharing modules 122, 124 of the computing devices 102, 104, as a stand-alone application, plug-in module, and so on. Further discussion of image session ranking techniques may be found beginning in relation to the discussion of FIG. 3.

Figure 2:
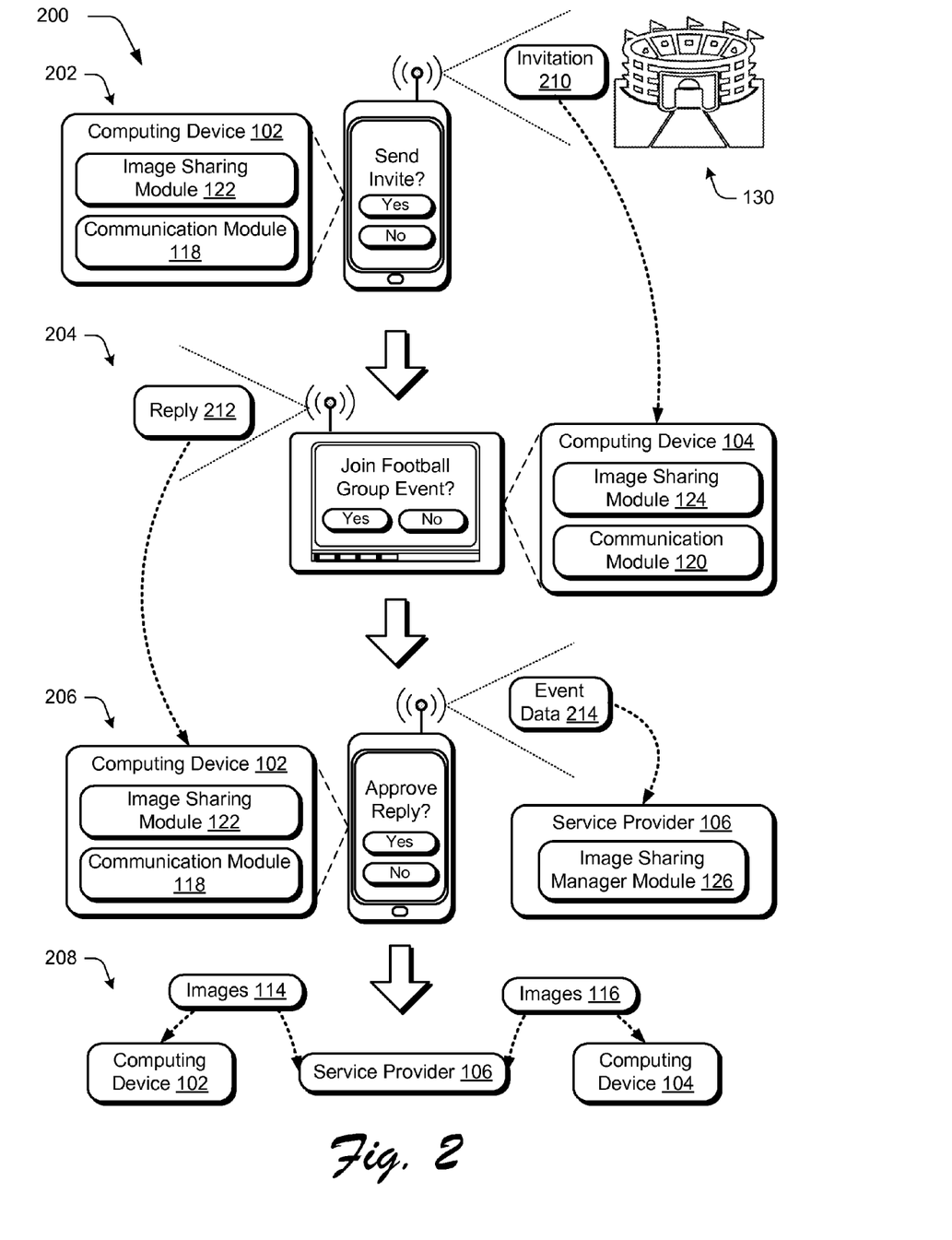
FIG. 2 depicts a system in an example implementation that employs a proximity invitation technique to invite potential members to join an image sharing session using a broadcast.

FIG. 2 depicts an example system 200 that employs a proximity invitation technique to invite potential members to join an image sharing session using a broadcast. The system 200 is shown using first, second, third, and fourth stages 202, 204, 206, 208. A user may obtain the image sharing module 122 in a variety of ways, such as via an application downloaded from the service provider 106, via an application store maintained by another service provider (e.g., where the image sharing module 122 is available for a fee, is free in return for viewing advertisements), and so on.

The user may then use the image sharing module 112 to interact with the image sharing manager module 126 of the service provider 106 to create an image sharing session. This may include creation of a unique identifier for the image sharing session and metadata describing the session, e.g., a name of an associated event 130, location, and so on. This data may then be communicated from the service provider 106 to the computing device 102 that is associated with a user that created the image sharing session, e.g., is accessing a user's account of the service provider 106.

At the first stage 202, the computing device 102 utilizes an image sharing module 112 and communication module 118 to broadcast an invitation 210 over a wireless local network at an event 130. The image sharing module 122, for instance, may output a user interface that includes an option to send an invitation 210. In response to selection of the invitation 210, the image sharing module 122 may cause the invitation 210 to be broadcast using wireless local area network functionality of the communication module. This may include Bluetooth wireless standard functionality, Wi-Fi wireless standard functionality, and other functionality to wirelessly broadcast the invitation 210 within near and midrange distances from the computing device 102, e.g., within twenty meters or so. In this way, the broadcast of the invitation may be made available to other users that are likely attending the event 130.

At the second stage 204, the invitation 210 is received by another computing device, such as computing device 104 that is configured as a tablet in this example. An image sharing module 124 may be employed by the computing device 104 to recognize the invitation 210 and display an option in a user interface to form a request to join the image sharing session. The user interface, for instance, may include metadata used to describe the event by a creator of the image sharing session, data that describes the creator of the image sharing session, data that identifies the image sharing session itself (e.g., number of members, identification of other members), and so on.

For example, a user associated with the computing device 104 may travel to the event 130 of FIG. 1 and wish to participate in one or more image sharing sessions that are available at the event 130. Therefore, a user may "bring up" the image sharing module 124 to receive invitations 210 broadcast at the event 130 and respond to invitations of interest by accepting the invitation 210. In response, the image sharing module 124 may form a communication to reply 212 to the invitation 210, which may include an identifier of a user of the computing device 104, e.g., the user's account at the service provider 106, a "guest" identifier that does not uniquely identify the user, an identifier of the device itself, and so on.

At the third stage 206, the computing device 102 that sent the invitation 210 at the first stage 202 receives the reply 212 from the computing device 104 to join the image sharing session. In response, the image sharing module 122 may then output a user interface having an option that is configured to verify whether to permit the potential member to join the image sharing session. The user interface, for instance, may include the unique identifier of the user (e.g., a name of a user account) and other identifying data, such as an image from a social network account and so on as desired by the sending user.

If the reply 212 is approved by the user of the computing device 102, the image sharing module 122 may then form a communication for communication via the network 108 to the service provider 106 to join the potential member to the image sharing session. For example, the communication may include event data 214 that uniquely identifies the image sharing session as described above as well as an identifier of a user received in the reply 212. The image sharing manager module 126 may then use the event data 214 to add the user associated with the computing device 104 to the identified image sharing session.

At the fourth stage 208, the service provider 106 manages sharing of images 114, 116 between the computing devices 102, 104 as part of the image sharing session. For example, the image sharing module 126 of the service provider 106 may output a user interface via which users of the computing devices 102, 104 may select which images to download, upload, and so on. In this way, the images 114, 116 may be shared between the computing devices 102, 104 as part of the image sharing session. Thus, in this example the proximity invitation technique may support ease of detection of broadcasted image sharing session and support approval and rejection of these sessions. Additionally, through use of standardized wireless local area network communications, cross platform compatibility may be supported, although other examples are also contemplated.

Further, although a single invitation example was described in relation to FIG. 2 it should be readily apparent that multiple image sharing sessions may be supported concurrently, such as to share a single image with multiple image sharing sessions, e.g., by selecting an image and then selecting identifiers of particular ones of the image sharing sessions. Further discussion of multiple invitations may be found beginning in relation to FIG. 3.

Thus, in this example a proximity invitation system was described that leverages a broadcast. Other techniques are also contemplated, such as to employ a scanning technique to leverage quick response (QR) codes, email invitations, social network invitations, and so on. Thus, a user and a corresponding user's device may encounter a variety of different invitations to participate in an image sharing session in a variety of different ways, an example of which is described as follows and shown in a corresponding figure.

Figure 3:
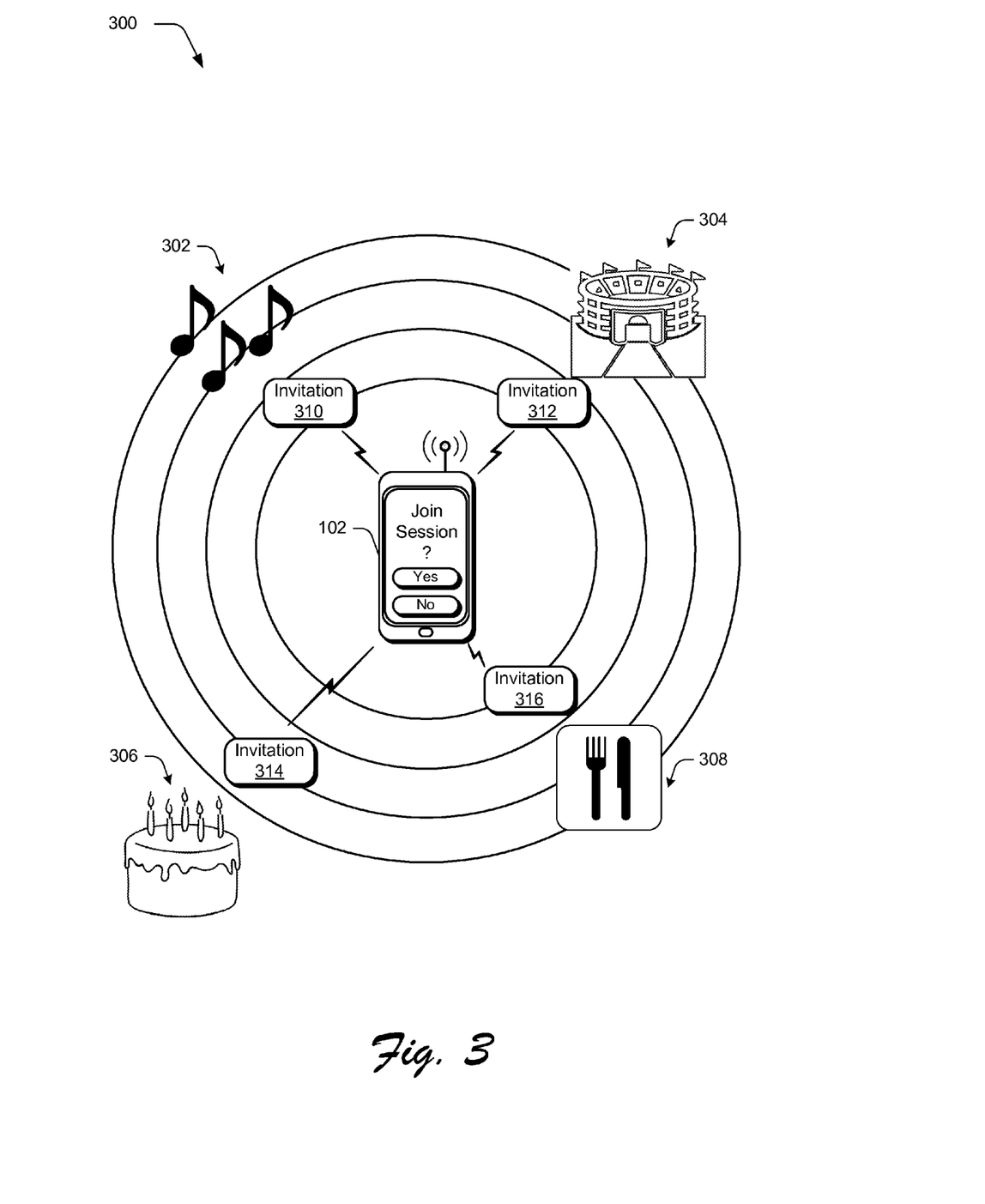
FIG. 3 depicts an example implementation of the computing device of FIG. 1 as receiving invitations to join a plurality of image sharing sessions.

FIG. 3 depicts an example implementation of the computing device 102 of FIG. 1 as receiving invitations to join a plurality of image sharing sessions. The computing device 102 in this instance is illustrated as a mobile computing device having a housing configured according to a mobile form factor, such as a mobile phone, tablet, portable game device, or other mobile communications device.

As such, the computing device 102 may be taken to a variety of different locations and therefore exposed to a variety of different events 130 of FIG. 1. The events in this instance are illustrated as a concert 302, a sporting event 304, a birthday 306, and a dining event 308. Each of these event 302, 304, 306, 308 may be associated with a respective image sharing session and thus invitations 310, 312, 314, 316 may be provided to join the sessions. However, even though the likelihood that a user may wish to join each of the image sharing sessions overall may be low, the likelihood that a user may wish to join a particular one of the sessions may be relatively high. Accordingly, techniques may be employed to determine a relative likelihood that a user may wish to join particular ones of the image sharing sessions, an example of which is further described below and shown in a corresponding figure.

Figure 4:
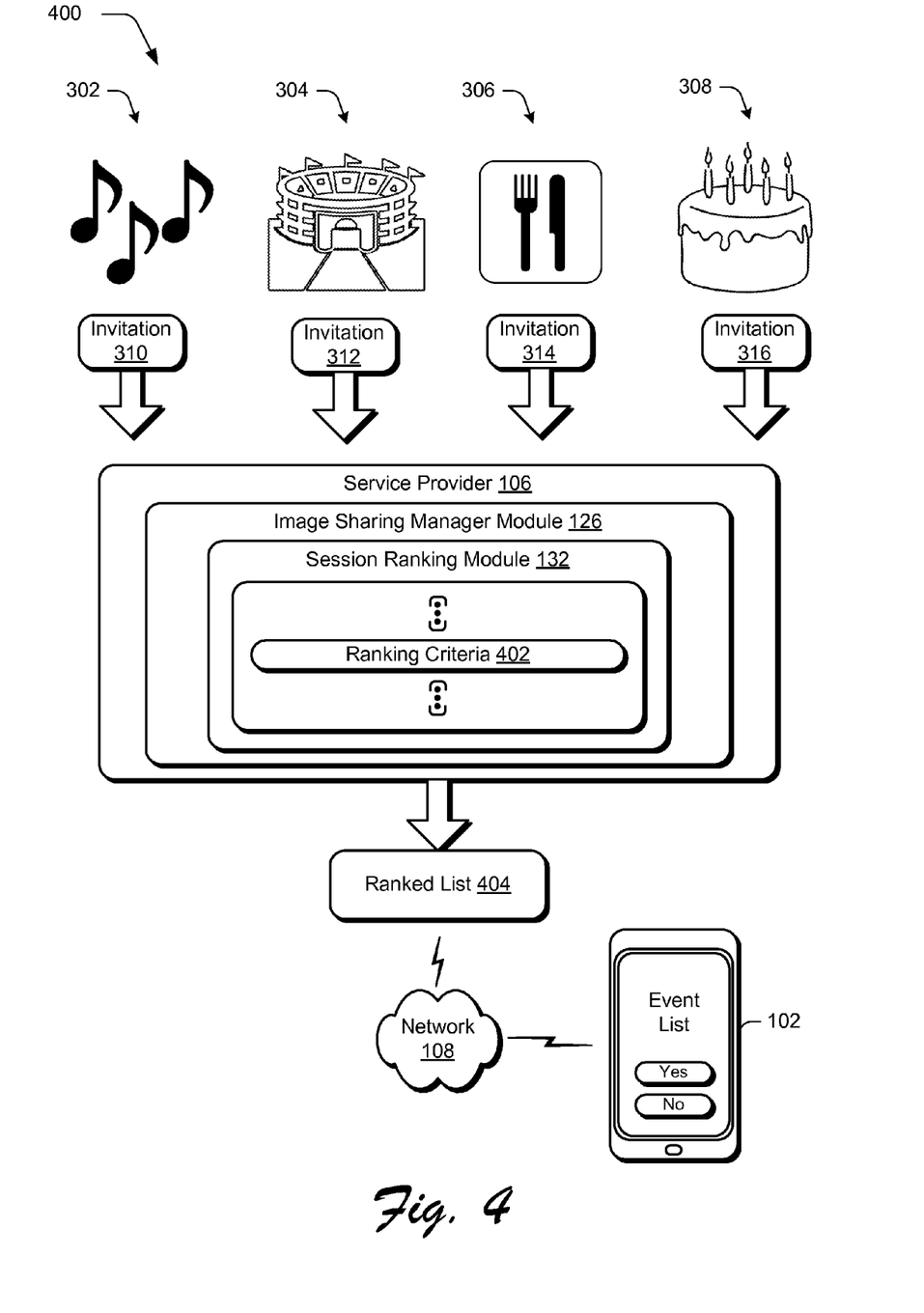
FIG. 4 depicts a system in an example implementation in which image sharing sessions are ranked based on one or more criteria to determine a relative likelihood that a user may wish to join respective sessions.

FIG. 4 depicts a system 400 in an example implementation in which image sharing sessions are ranked based on one or more criteria to determine a relative likelihood that a user may wish to join respective sessions. In this example, a service provider 106 receives invitations 310-316 of image sharing sessions that are available for joining by a user.

These invitations may be obtained in a variety of ways. For example, a computing device 102 may collect the invitations that are made available via proximity techniques, such as a broadcast as described in relation to FIG. 2, scanning techniques (e.g., an event poster, a representation on a user's phone), and so on. Other examples are also contemplated, such as to collect the invitations via a social network site via an account of the user, from emails, text messages, electronic invitations, and so on. For example, a promoter of the concert 302 may provide a general invitation 310 that is not limited to any particular user, e.g., via a website, a poster at the event, and so on. Thus, the invitations may originate from a variety of different sources.

The collected invitations may then be processed by the session ranking module 132 of the image sharing manager module 126 to determine a relative likelihood that a user may wish to join a respective image sharing session, which may be used to form a ranked list 404 of the image sharing sessions. The session ranking module 132, for instance, may employ one or more ranking criteria 402 that may be used to calculate a numerical value that expresses this relative likelihood. Further, this calculation may be performed in real time to address changing conditions associated with the user, the image sharing session, and/or the associated event, e.g., change in user location, time, and so on.

A variety of different criteria may be considered by the session ranking module 132. For example, one or more of the criteria may relate to proximity, such as a likely proximity of a user with respect to an event associated with the image sharing session. In an instance of a broadcast as discussed in relation to FIG. 2, for example, detection via the Bluetooth wireless standard, the Wi-Fi wireless standard, or other person-to-person communication may be used to determine proximity. Other examples are also contemplated, such as based on geographical coordinates of an associated event and a current location of the user, and so on. The invitation, for instance, may include an indication of a geographical location (e.g., GPS coordinates) that may be compared with a current location of the computing device 102. In this way, image sharing sessions that are associated with events that are located closer to the user may be given a higher priority than other sessions.

In another example, one or more of the criteria may relate to a likelihood that a user knows one or more other users associated with an image sharing event. This knowledge may be based on a variety of different sources, such as whether the one or more other users are included in a contacts list of a user, which may include email contacts, social network contacts, and so on.

Further, different priorities may be assigned based on a source, such as to give a higher priority to friends in a social network than contacts in a business-centric social network. Other examples are also contemplated, such as a past history of a user in joining image sharing sessions and identities of other users that also joined that session, identities of contributors that captured images downloaded by a user, and so on.

In a further example, one or more of the criteria may be based on a number of members that have joined an image sharing session. For example, an image sharing session associated with a dinner event may have fewer contributors than a concert and thus may have a relatively lower likelihood that a user may wish to join the session.

In yet another example, one or more of the criteria may relate to a number of social mentions. This may include a number of comments associated with an image sharing session, a number of mentions in status updates in a social network, and so on. Thus, the number of social mentions may indicate an amount of interest of other users in an image sharing session and thus may be used as a basis to assign priority to an event.

Although a few examples of criteria were mentioned, it should be readily apparent that a wide variety of other metadata may be used as a basis to assign criteria. Other examples of metadata include a number of image shares, number of images in an event, other geographic data, and so on. Further, different weights may be assigned to the criteria, such as to given a higher priority to proximity and contacts and lesser priority to social mentions. The priorities may then be used to rank image sharing sessions in a list, which may be configured in a variety of ways, an example of which is described as follows and shown in a corresponding figure.

Figure 5:
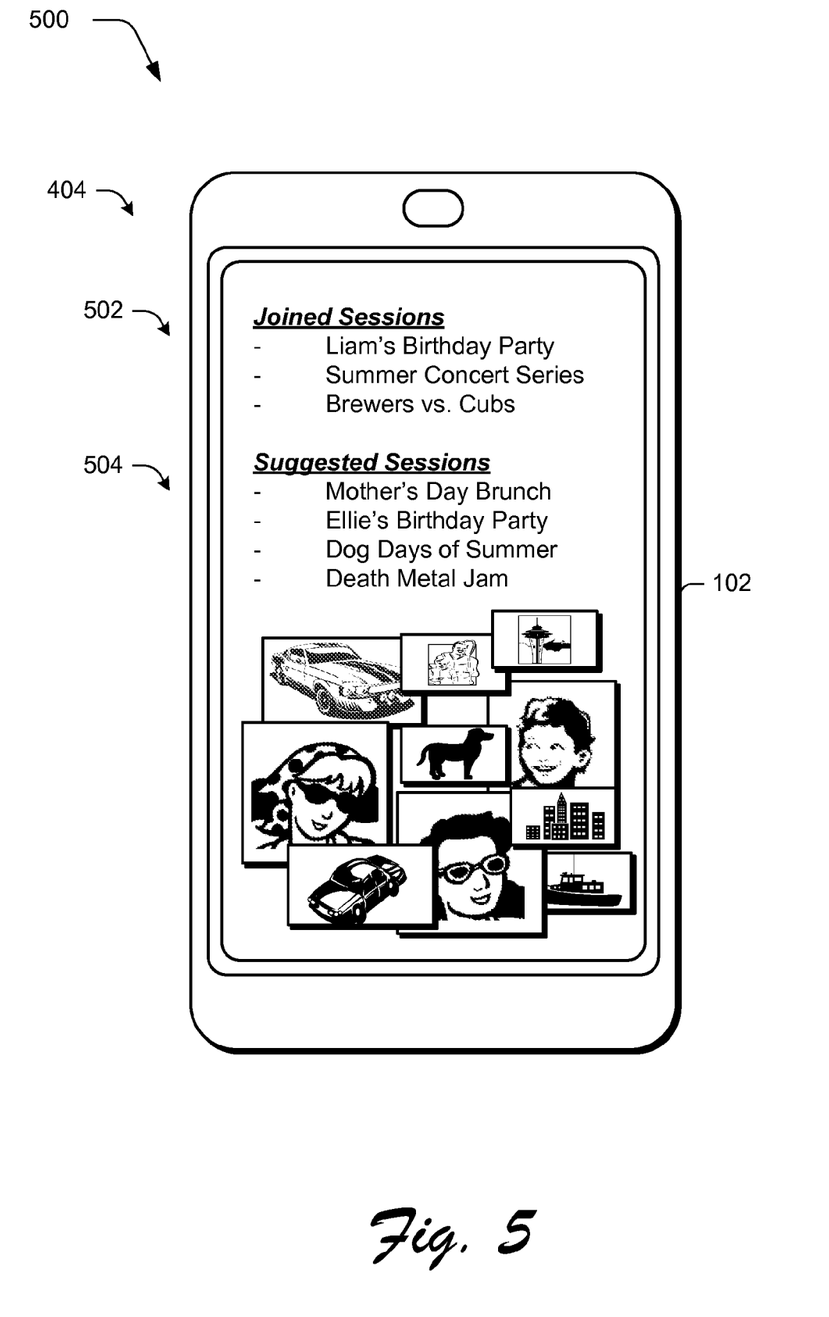
FIG. 5 depicts an example of a user interface output by a computing device of FIG. 1, the user interface including a ranked list of suggested image sharing sessions along with indications of image sharing sessions that the user joined as a member.

FIG. 5 depicts an example implementation 500 of a user interface output by a computing device of FIG. 1, the user interface includes a ranked list 404 of suggested image sharing sessions along with indications of image sharing sessions that the user joined as a member. The list 404 in this instance includes a portion 502 that includes identifications of image sharing sessions, to which, an associated user has joined, i.e., is a member.

The list 404 also includes a portion 504 that includes a list of suggestions of available image sharing sessions that are ranked according to relative priorities as calculated in the discussion of FIG. 4. In this way, a user may be made aware of which images sharing sessions have been joined as well as other image sharing sessions that are available based on a likely interest of a user in joining the image sharing session. It should be readily apparent that a wide variety of other user interfaces and configurations of the list 404 are also contemplated without departing from the spirit and scope thereof.

Example Procedures

The following discussion describes image session ranking techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
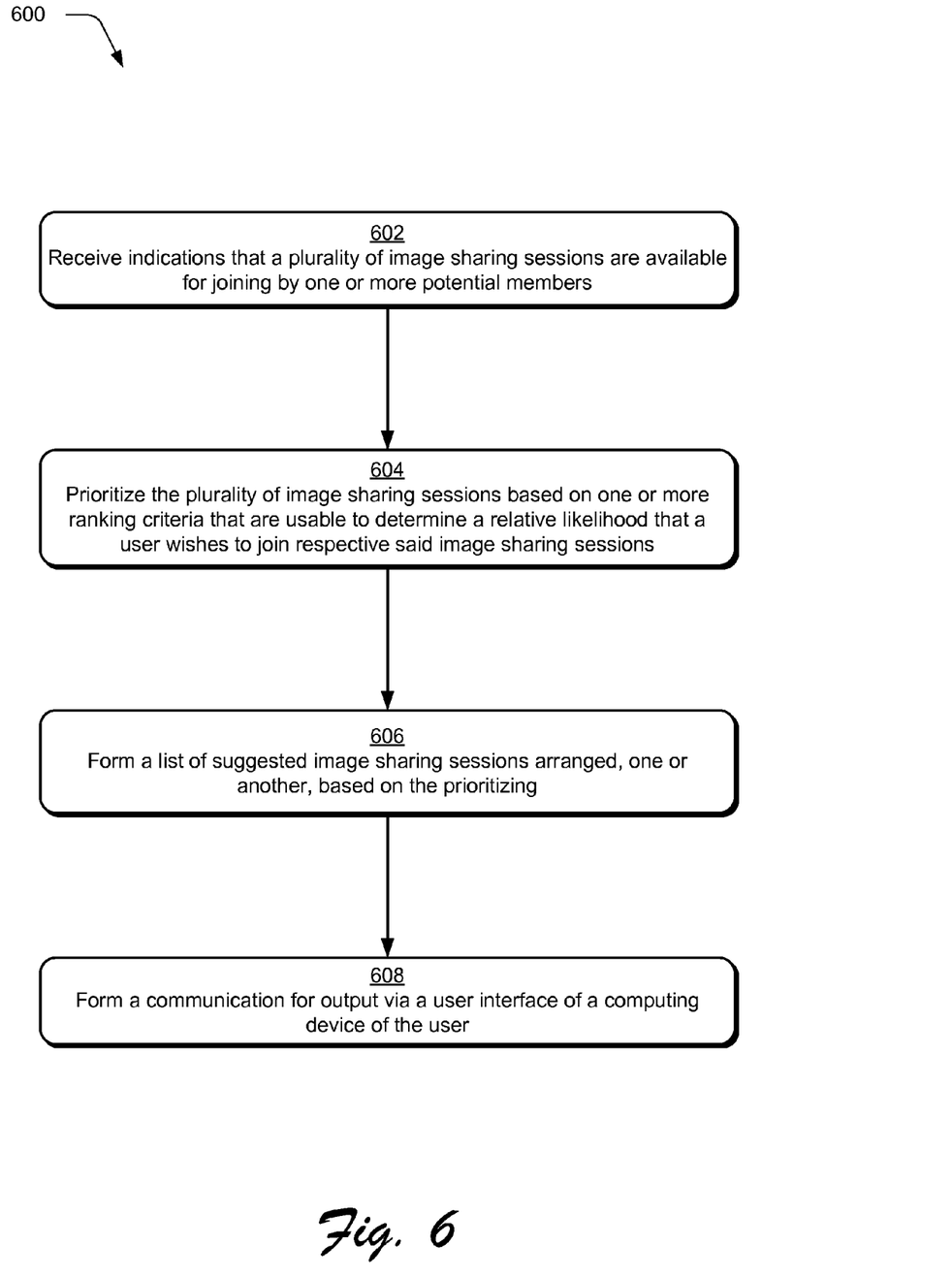
FIG. 6 is a flow diagram depicting a procedure in an example implementation in which image sharing sessions are ranked accordingly to a relative likelihood that a user may wish to join a respective one of the sessions.

FIG. 6 depicts a procedure 600 in an example implementation in which image sharing sessions are ranked accordingly to a relative likelihood that a user may wish to join a respective one of the sessions. Indications are received that a plurality of image sharing sessions are available for joining by one or more potential members (block 602). The indications may be received in a variety of ways, such as via a broadcast invitation, a posting to social network, an email, text message, and so on. Further, this indications may be specific to a user (i.e., for that particular user), for anyone that receives the indication (e.g., viewing a movie poster), and so on.

The plurality of image sharing sessions are prioritized based on one or more ranking criteria that are usable to determine a relative likelihood that a user wishes to join respective image sharing sessions (block 604). A variety of different criteria may be used, such as based on proximity, whether a user is known to another user, number of members of an image sharing session, number of images shared, and so on.

A list is formed of suggested image sharing sessions that are arranged, one or another, based on the priority (block 606). The priority, for instance, may be computed such that a determination may be made is to which of the image sharing sessions are more likely to be of interest to a user than others.

A communication is formed for output via a user interface of a computing device of the user (block 608). For example, a communication may be configured for communication from the service provider 106 via the network 108 to a user's computing device 102 for output. Other examples are also contemplated, such as in an instance in which functionality of the session ranking module 132 is provided locally by the computing device 102, itself.

Example System and Device

Figure 7:
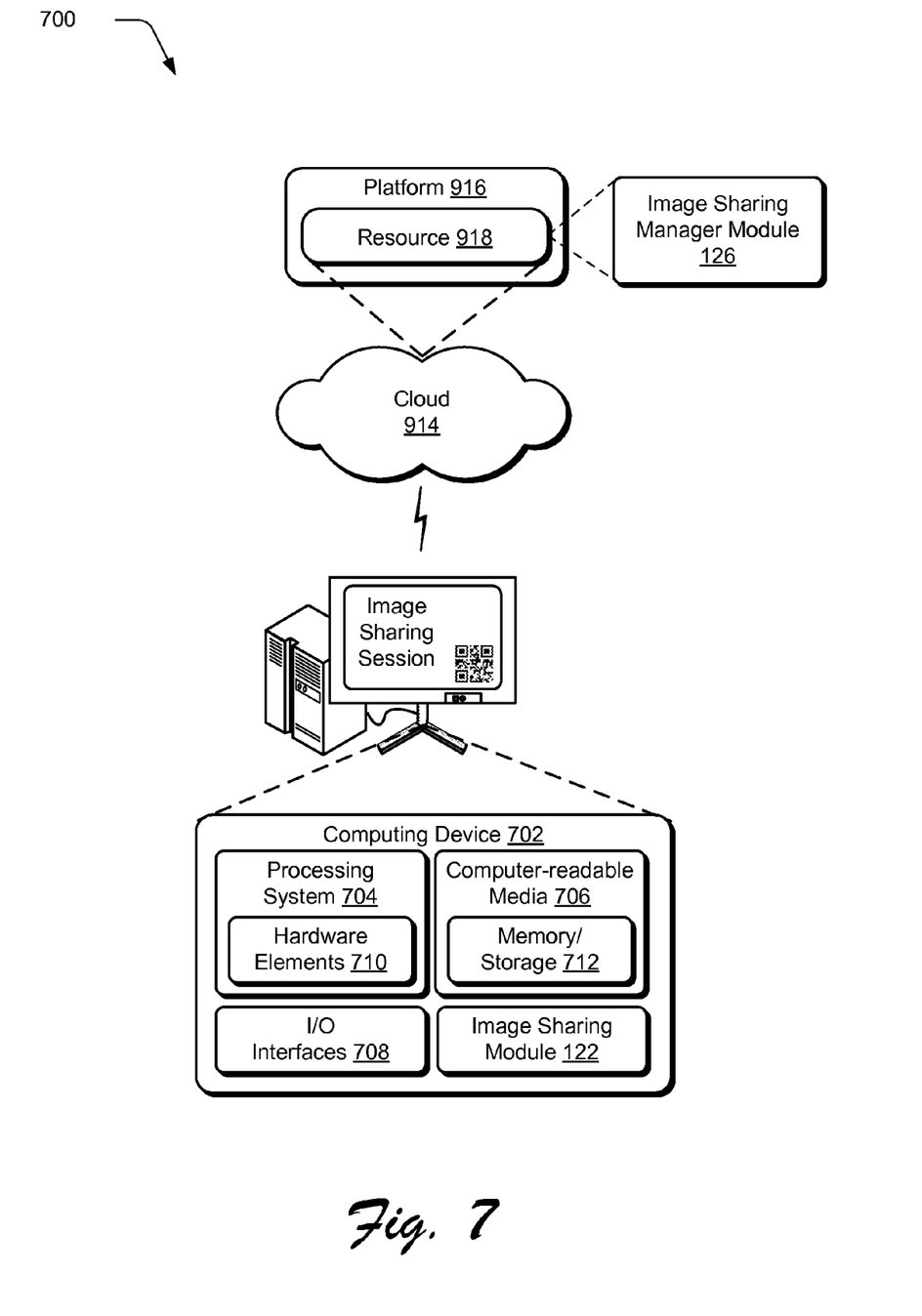
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the image sharing module 122 and image sharing manager module 126. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi wireless standard network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
  receiving indications that a plurality of image sharing sessions are available for joining by one or more potential members, the image sharing sessions being broadcast without manual management on the part of a creator;
  prioritizing the plurality of image sharing sessions based on each one of a plurality of ranking criteria that are usable to determine a relative likelihood that a user wishes to join respective said image sharing sessions, the ranking criteria being based on a combination of information from a plurality of different social networking accounts, information from a plurality of different non-social networking sources, as well as information from image sharing session history, the information used for each one of the plurality of the ranking criteria being given custom weighting by the user; and
  forming a first list of suggested image sharing sessions that are available for the user to join, the first list of suggested image sharing sessions arranged, one to another, based on the prioritizing.

2. A method as described in claim 1, wherein one or more of the image sharing sessions are associated with an event and invitations to join the one or more image sharing sessions are retrieved by scanning of one or more quick response (QR) codes by the one or more computing devices.

3. A method as described in claim 1, further comprising forming a communication for output via a user interface of a computing device of the user.

4. A method as described in claim 1, wherein the receiving, the prioritizing and the forming are performed in real time based at least in part on a likely current location of the user.

5. A method as described in claim 1, wherein the receiving, the prioritizing and the forming are performed by the one or more computing devices that are part of service provider that is available to a computing device of the user via a network.

6. A method as described in claim 1, wherein the plurality of ranking criteria include at least one criterion that is based on a proximity of the user to an event associated with a respective said image sharing session.

7. A method as described in claim 1, wherein the plurality of ranking criteria include at least one criterion that is based on whether another user associated with a respective said image sharing session is known to the user.

8. A method as described in claim 1, wherein the plurality of ranking criteria include at least one criterion that is based on a number of members associated with a respective said image sharing session.

9. A method as described in claim 1, wherein the plurality of ranking criteria include at least one criterion that is based on a number of likes or comments associated with a respective said image sharing session.

10. A method as described in claim 1, wherein the plurality of ranking criteria include a number of images shared via a respective said image sharing session, a number of images associated with an event associated with a respective said image sharing event, or geographic data associated with a respective said image sharing event.

11. A method as described in claim 1, wherein higher priority is given to people associated with the user through one particular social network than to people associated with the user through a different social network.

12. A method as described in claim 1, further comprising forming a second list with indications of associated image sharing sessions that the user previously has joined as a member.

13. A computing device comprising:
a housing having a mobile form factor;
a display device disposed on the housing; and
one or more modules disposed in the housing and implemented at least partially in hardware, the one or more modules configured to collect invitations to join respective ones of a plurality of image sharing sessions being broadcast without manual management on the part of an image sharing session creator and display a list of the image sharing session on the display device, the list having the plurality of image sharing sessions prioritized, one to another, based on a likelihood that a user will desire to join respective said sessions, the prioritization being based on each one of a plurality of ranking criteria, the ranking criteria being based on a combination of information from a plurality of different social networking accounts, information from a plurality of different non-social networking sources, and information from image sharing session history, the information used for each one of the plurality of ranking criteria for the prioritization being given custom weighting by the user.

14. A computing device as described in claim 13, wherein the one or more modules are configured to communicate the collected invitations for receipt by a service provider via a network and received the list from the service provider.

15. A computing device as described in claim 13, wherein the list is prioritized based on proximity of a user to an event associated with a respective said image sharing session.

16. A computing device as described in claim 13, wherein the list is prioritized based on whether another user associated with a respective said image sharing session is known to the user.

17. A computing device as described in claim 13, wherein the list is prioritized based on a number of members associated with a respective said image sharing session.

18. A computing device as described in claim 13, wherein the list is prioritized based on a number of likes or comments associated with a respective said image sharing session, a number of images shared via a respective said image sharing session, a number of images associated with an event associated with a respective said image sharing event, or geographic data associated with a respective said image sharing event.

19. A system comprising:
at least one computing device configured to perform operations comprising:
prioritizing a plurality of image sharing sessions in real time based on each one of a plurality of ranking criteria that are usable to determine a relative likelihood that a user wishes to join respective said image sharing sessions, the ranking criteria being based on a combination of information from a plurality of different social networking accounts, information from a plurality of different non-social networking sources, as well as information from image sharing session history, the information used for each one of the plurality of the ranking criteria being given custom weighting by the user;
forming a first list of suggested image sharing sessions in real time that is available for the user to join, the first list of suggested image sharing sessions arranged, one or another, based on the prioritizing configured for output in a user interface; and
forming a second list with indications of associated image sharing sessions that the user previously has joined as a member.

20. A system device as described in claim 19, wherein the first list is prioritized based on:
proximity of a user to an event associated with a respective said image sharing session;
whether another user associated with a respective said image sharing session is known to the user;
a number of members associated with a respective said image sharing session;
a number of likes or comments associated with a respective said image sharing session;
a number of images shared via a respective said image sharing session;
a number of images associated with an event associated with a respective said image sharing event, or
geographic data associated with a respective said image sharing event.

* * * * *